(12) United States Patent
Geurts et al.

(10) Patent No.: US 8,167,365 B2
(45) Date of Patent: May 1, 2012

(54) OPEN ROOF CONSTRUCTION FOR A VEHICLE

(75) Inventors: Ruud Geurts, Helden (NL); Marcel Johan Christiaan Nellen, Merselo (NL)

(73) Assignee: Inalfa Roof Systems Group B.V., Venray (NL)

( * ) Notice: Subject to any disclaimer, the term of this patent is extended or adjusted under 35 U.S.C. 154(b) by 0 days.

(21) Appl. No.: 12/893,495

(22) Filed: Sep. 29, 2010

(65) Prior Publication Data

US 2011/0080023 A1     Apr. 7, 2011

(30) Foreign Application Priority Data

Oct. 5, 2009 (EP) .................................. 09172240

(51) Int. Cl.
*B60J 7/057* (2006.01)
*B60J 7/05* (2006.01)
(52) U.S. Cl. ...................................... 296/223; 296/221
(58) Field of Classification Search .................. 296/221, 296/223
See application file for complete search history.

(56) References Cited

U.S. PATENT DOCUMENTS

| | | |
|---|---|---|
| 4,417,763 A | 11/1983 | Schlapp et al. |
| 4,619,480 A | 10/1986 | Motoyama et al. |
| 4,647,104 A | 3/1987 | Kohlpaintner et al. |
| 4,671,565 A | 6/1987 | Grimm et al. |
| 4,684,169 A | 8/1987 | Igel et al. |
| 4,725,092 A | 2/1988 | Reintges et al. |
| 4,752,099 A | 6/1988 | Roos et al. |
| 4,877,285 A | 10/1989 | Huyer |

(Continued)

FOREIGN PATENT DOCUMENTS

DE          3442600          5/1986

(Continued)

OTHER PUBLICATIONS

Official Search Report of the European Patent Office in counterpart foreign European patent application No. 09172240.5, filed Oct. 5, 2009.

(Continued)

*Primary Examiner* — Dennis Pedder
(74) *Attorney, Agent, or Firm* — Steven M. Koehler; Westman, Champlin & Kelly, P.A.

(57) ABSTRACT

An open roof construction for a vehicle having an opening in the fixed roof, comprises stationary longitudinal guide rails on either side of the roof opening and slidable slides with operating mechanisms. A panel supported by the operating mechanisms is adjustable between a closed position, in which it closes the roof opening, and an open position, in which it releases the roof opening at least partially. Each operating mechanism comprises a curve plate attached to the panel and has a first guide track with which a first guide member connected to the slide is in engagement, at least along part of the path of movement of the panel. The slide includes a height-adjustable part which is equipped with the first guide member, and is also equipped with a second guide member which is in engagement with a second guide track having a vertical component. The second guide track is provided at a curve part which is connected to the guide rail. The first and second guide tracks are positioned relatively such that they have a common vertical longitudinal plane extending there through. The guide tracks are selectively movable with respect to each other in a direction parallel to guide rails to enable the first and second guide tracks to overlap in height direction without crossing each other.

22 Claims, 8 Drawing Sheets

U.S. PATENT DOCUMENTS

| | | | |
|---|---|---|---|
| 5,020,849 | A | 6/1991 | Schlapp et al. |
| 5,058,947 | A | 10/1991 | Huyer |
| 5,066,068 | A | 11/1991 | Suzuki et al. |
| 5,259,662 | A | 11/1993 | Huyer |
| 5,527,085 | A | 6/1996 | Ochiai et al. |
| 5,593,204 | A | 1/1997 | Wahl et al. |
| 5,845,959 | A | 12/1998 | Ueki |
| 6,164,718 | A | 12/2000 | Stallfort |
| 6,257,658 | B1 | 7/2001 | Nabuurs et al. |
| 6,325,453 | B1 | 12/2001 | Manders |
| 6,343,833 | B1 | 2/2002 | Manders |
| 6,390,544 | B1 | 5/2002 | Manders |
| 6,394,540 | B1 | 5/2002 | Manders |
| 6,419,310 | B1 | 7/2002 | Manders |
| 6,471,286 | B1 | 10/2002 | Manders |
| 6,494,529 | B1 | 12/2002 | Manders |
| 7,055,898 | B2 * | 6/2006 | Manders et al. .............. 296/222 |

FOREIGN PATENT DOCUMENTS

| | | |
|---|---|---|
| DE | 3603314 | 6/1987 |
| DE | 3603314 A1 | 8/1987 |
| DE | 3930756 | 3/1991 |
| DE | 9116412 | 11/1993 |
| DE | 4405742 | 5/1995 |
| DE | 19514585 | 10/1996 |
| DE | 202008006885 U1 | 8/2008 |
| EP | 0033816 | 8/1981 |
| EP | 0143589 | 6/1985 |
| EP | 0218890 | 4/1987 |
| EP | 0343750 | 11/1989 |
| EP | 0517318 | 12/1992 |
| EP | 0747249 | 12/1996 |
| EP | 0899140 | 3/1999 |
| FR | 2495068 | 6/1982 |
| FR | 2527995 | 12/1983 |
| JP | 0278422 | 12/1986 |
| JP | 0104734 | 3/1991 |
| JP | 404297323 | 10/1992 |
| WO | WO 00/06403 | 2/2000 |

OTHER PUBLICATIONS

"The Woodworkers' Store", 1993-1994 Catalog.

* cited by examiner

OPEN ROOF CONSTRUCTION FOR A VEHICLE

BACKGROUND

The discussion below is merely provided for general background information and is not intended to be used as an aid in determining the scope of the claimed subject matter.

An open roof construction is known from WO 00/06403. The structure of this prior art roof construction, in the form of a tilt-slider, is such that a long curve on both the curve plate and the curve part enables the complete transitional function of the closure member, that is from the closed position in which the closure member closes the roof opening to the venting position, in which the rear end of the closure member is pivoted upwardly, and from the closed position to a lowered sliding position of the closure member. To make this possible without leading to a large packaging height, the curve plate drops between two legs of the curve part, in the lowered position of the closure member. It is this particular feature, the spaced legs of the curve part which may receive the curve plate, that makes the mechanism having a considerable width. This considerable width dimension is unfavorable, because it reduces the daylight opening of the closure member, i.e. the glass panel, in a lateral direction, given a certain aperture opening in the fixed roof. Also in vertical perspective it is favorable to have a small packaging height of the mechanism, for the reason of having more headspace for the occupants inside the vehicle, given a certain outside body shape.

SUMMARY

This Summary and the Abstract herein are provided to introduce a selection of concepts in a simplified form that are further described below in the Detailed Description. This Summary and the Abstract are not intended to identify key features or essential features of the claimed subject matter, nor are they intended to be used as an aid in determining the scope of the claimed subject matter. The claimed subject matter is not limited to implementations that solve any or all disadvantages noted in the background.

An open roof construction according to an aspect of the invention includes stationary longitudinal guide rails on either side of the roof opening. A closure member is adapted to open and close the roof opening. A pair of slides is provided where each slide is slidable on one of the longitudinal guide rails. Each of the slides includes an operating mechanism supporting the closure member so as to be adjustable between a closed position, in which the closure member closes the roof opening, and an open position, in which the closure member releases the roof opening at least partially. Each operating mechanism comprises a curve plate attached to the closure member and having a first guide track with which a first guide member connected to the slide is in engagement, at least along part of the path of movement of the closure member, wherein each slide includes a height-adjustable part which is equipped with the first guide member, and is also equipped with a second guide member which is in engagement with a second guide track which is at least partially inclined vertically. The second guide track is provided at a curve part which is connected to the longitudinal guide rail, wherein the first and second guide tracks are positioned relatively such that they have a common vertical longitudinal plane extending therethrough, and the first and second guide tracks being selectively movable with respect to each other in a direction parallel to the longitudinal guide rails to enable the first and second guide tracks to overlap in height direction without crossing each other.

Bringing the first and second guide track closer to each other is advantageous, because this reduces the lateral package of the construction.

In one embodiment, the shape of the first guide track and that of the second guide track is such that these shapes are similar to a large extent. The first and second guide tracks are selectively movable in relation to each other, in a direction parallel to the guide. In this way it is possible to selectively place one of the guide tracks longitudinally at least partly in front of the other to prevent the tracks to cross when the first track is moved downwardly, or place the tracks longitudinally with respect to each other such that a lower part of the first guide track is positioned above an upper part of the second guide track thereby maximizing the tilting height of the closure member. This is for example conceivable if the first and second guide tracks extend substantially parallel at least in the closed position of the closure member.

In one embodiment, the first and second guide members are continuously in engagement with their respective first and second guide tracks, and in the maximally open position of the closure member the first guide member is in engagement with a lowest part of the first guide track and the second guide member is in engagement with a highest part of the second guide track.

In a further embodiment, the first and second guide tracks have front and rear end parts forming the lowest and highest parts of the first and second guide tracks and extending substantially parallel to the respective guide rail at least in the position of the closure member in which the first and second guide member are in engagement with said front and rear end parts, and have a vertically inclined intermediate part between said end parts.

The first and second guide tracks may have lengths that differ no more than 50%, and more particularly no more than 10% of the shortest length.

In one embodiment the height-adjustable part is selectively movable with respect to the first and/or second guide track, and wherein the slide is fixed to the curve part.

In this way the longitudinal movement between the guide tracks is obtained by driving the second guide track directly, while the movement with respect to the height-adjustable part is accomplished through the selective movement thereof with respect to the first and/or second guide track.

This selective movement can be obtained if the height-adjustable part is provided with a locking mechanism so as to substantially lock the height-adjustable part to one of the first and second guide tracks when the height-adjustable part moves with respect to the other of the first and second guide tracks.

The height-adjustable part may be connected to the first and second guide tracks through guide member-guide curve connections including said locking mechanism. The guide curves may include a locking and/or unlocking portion to form at least a part of the locking mechanism.

A simple structure is obtained if the guide member is a pivot pin and the height-adjustable part is an arm which is rotatable around the pivot pin. The pivot pin thus has a double function thereby reducing the number of parts in the operating mechanism.

If the operating mechanism is adapted to cause the closure panel to make two distinct movements, it is practicable that the height-adjustable part moves with respect to the first guide track during a first movement and the height-adjustable part moves with respect to the second guide track during a second movement.

For example, if the open roof construction is constructed as a sliding-tilting roof, the height-adjustable part may move with respect to the first guide track during an upward tilting movement of the closure member from the closed position and the height-adjustable part may move with respect to the second guide track during an downward tilting movement of the closure member from the closed position.

In one embodiment, the locking mechanism is constructed such that the locking mechanism is actuated when the height-adjustable part moves with respect to both the first and second guide track.

If the first and second guide tracks are positioned one above the other the total width dimension of the guide tracks can be minimized.

If the first and second guide members engage the first and second guide tracks from one side, a further reduction in width dimension can be obtained as they can lie one above the other as well.

In another embodiment the height-adjustable part is an arm which is rotatable around a pivot, the length of the arm being greater than that of the first and second guide tracks. As a result, the arm may be in constant engagement with the locking mechanism, for example with or near its pivot, while the locking mechanism may be positioned at sufficient distance in front, which may be preferable, or behind the guide tracks, such that no additional width for the locking mechanism being necessary.

BRIEF DESCRIPTION OF THE DRAWINGS

Aspects of the invention will be elucidated with reference to the drawings showing an embodiment of the open roof construction by way of example. In the drawings.

DETAILED DESCRIPTION OF THE ILLUSTRATIVE EMBODIMENTS

Figure 1:
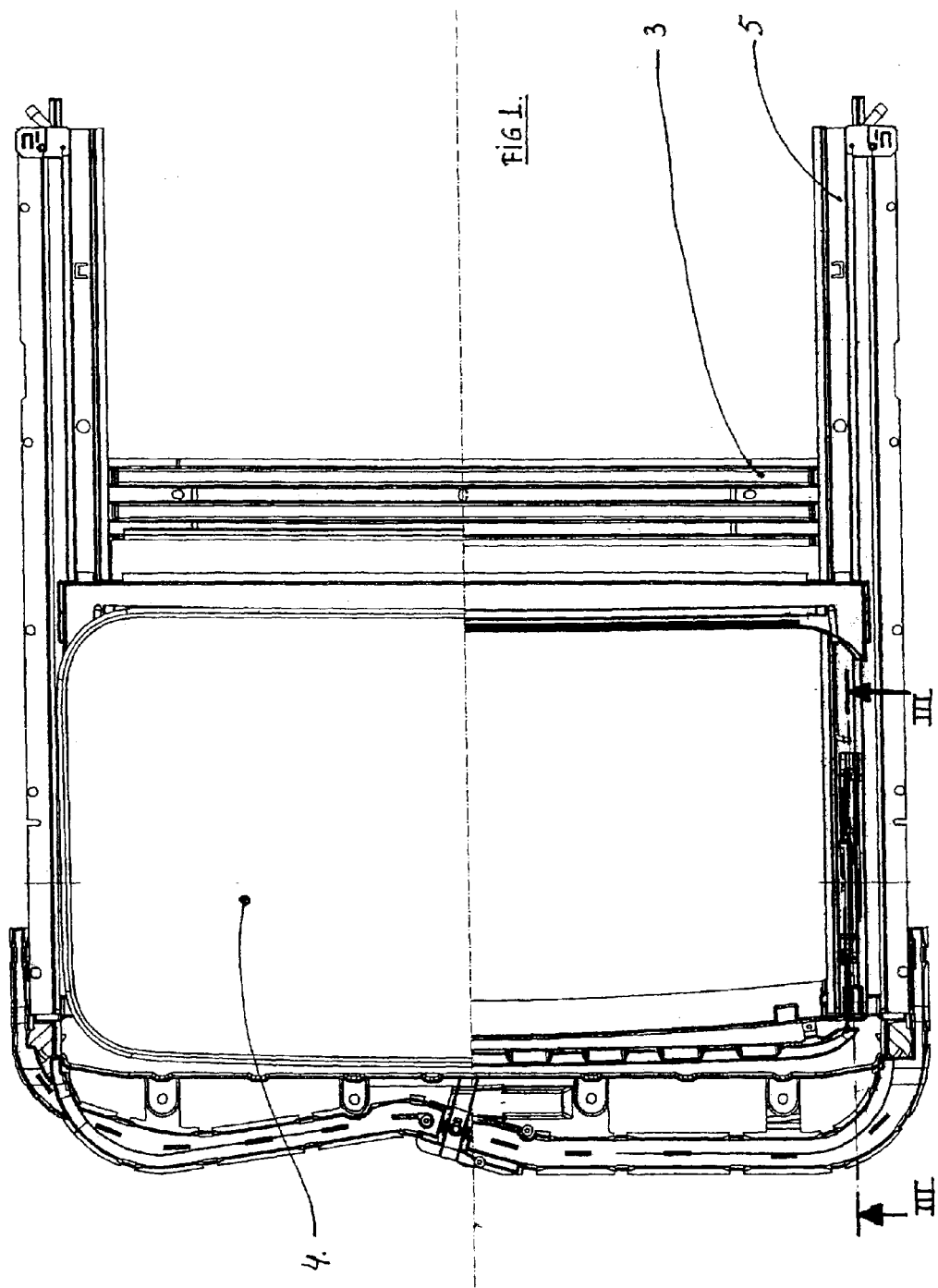
FIG. 1 is a plan view of the embodiment of the open roof construction, in which a closure member is in a closed position, and in which for the sake of clarity the closure member is omitted in the lower half of the figure to reveal the operating mechanism under it.

Referring to FIG. 1, an open roof construction for a vehicle is shown, in particular a sliding-tilting roof for a passenger car. Either the vehicle or the open roof construction comprises a fixed roof 1 having a roof opening 2 therein. A roof assembly includes a closure member 4 capable of selectively opening and closing the roof opening 2. A frame 3 or a different stationary part attached to or formed from part of the fixed roof 1 supports, in a manner yet to be described in more detail, the closure member 4

As mentioned above, the illustrated embodiment is a so called sliding-tilting roof, wherein the closure member 4 herein is a rigid panel, which on the one hand can be moved from the closed position in the roof opening 2 (FIGS. 1 and 3) to a venting position (FIG. 4), in which it slopes upwards from the front to the rear end, and which on the other hand can be moved from the closed position downwards (FIG. 5) and subsequently rearwards to a position under the fixed roof (not shown).

In order to make said movements possible, panel 4 is provided on either side with an operating mechanism, one of which is shown in the drawings, whereby the same mechanism is used in a mirror image execution at the other longitudinal edge of the panel 4. The operating mechanisms are accommodated in guide rails 5, which are mounted on frame 3 or integrated therein or formed from fixed roof 1 and which extend on either side of the roof opening 2 and rearwards thereof under fixed roof 1. Each operating mechanism is driven by a slide 6 (see FIGS. 2, 3, 4, 5), which is guided in guide rail 5 and which can be moved in guide rail 5 by means of a pull-push cable (not shown) or other connecting element which is connected to driving means such as an electric motor, a hand crank or the like.

Figure 2:
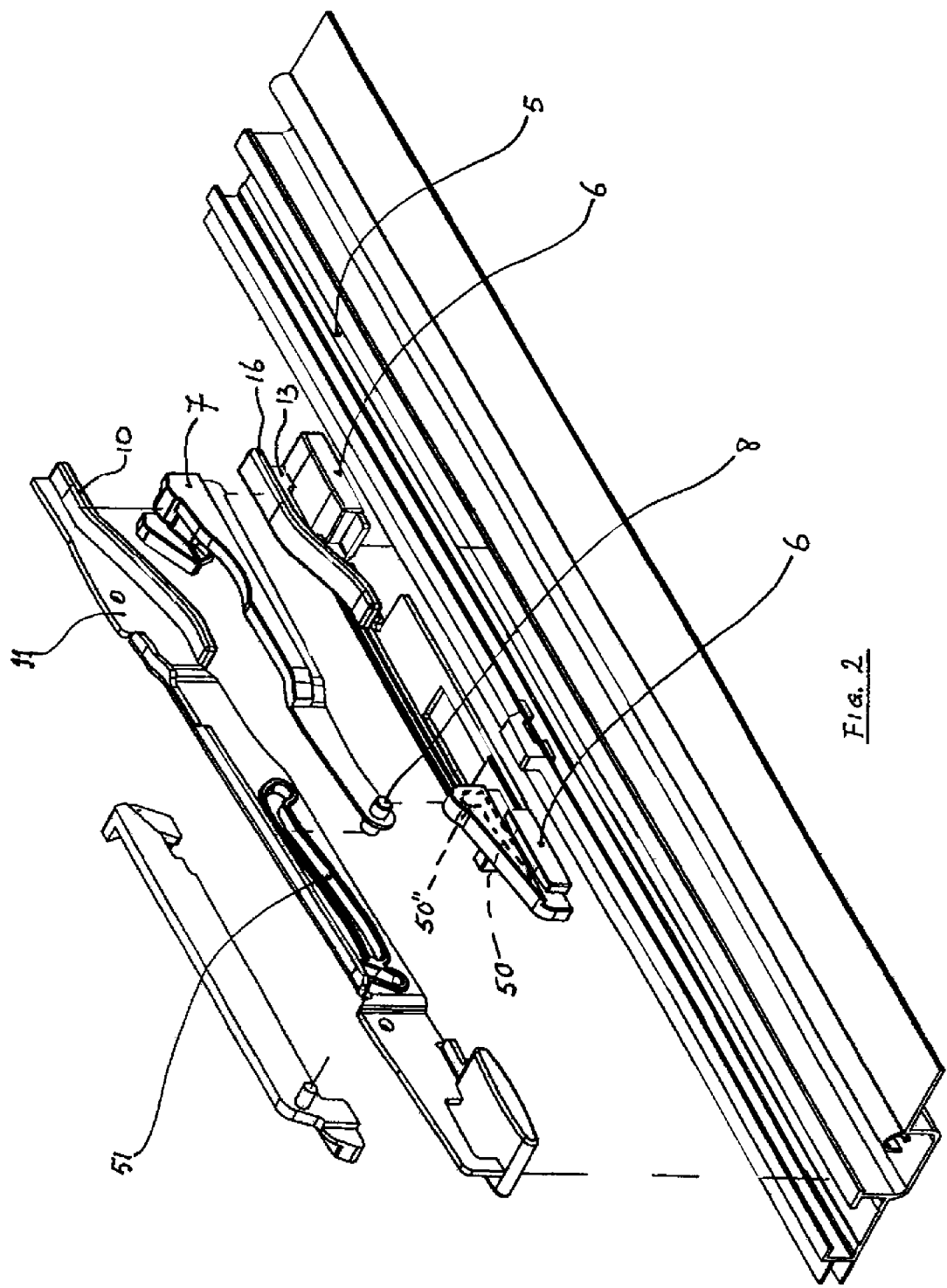
FIG. 2 is an exploded view of the operating mechanism of FIG. 1, including the corresponding guide rail.
Figure 3:
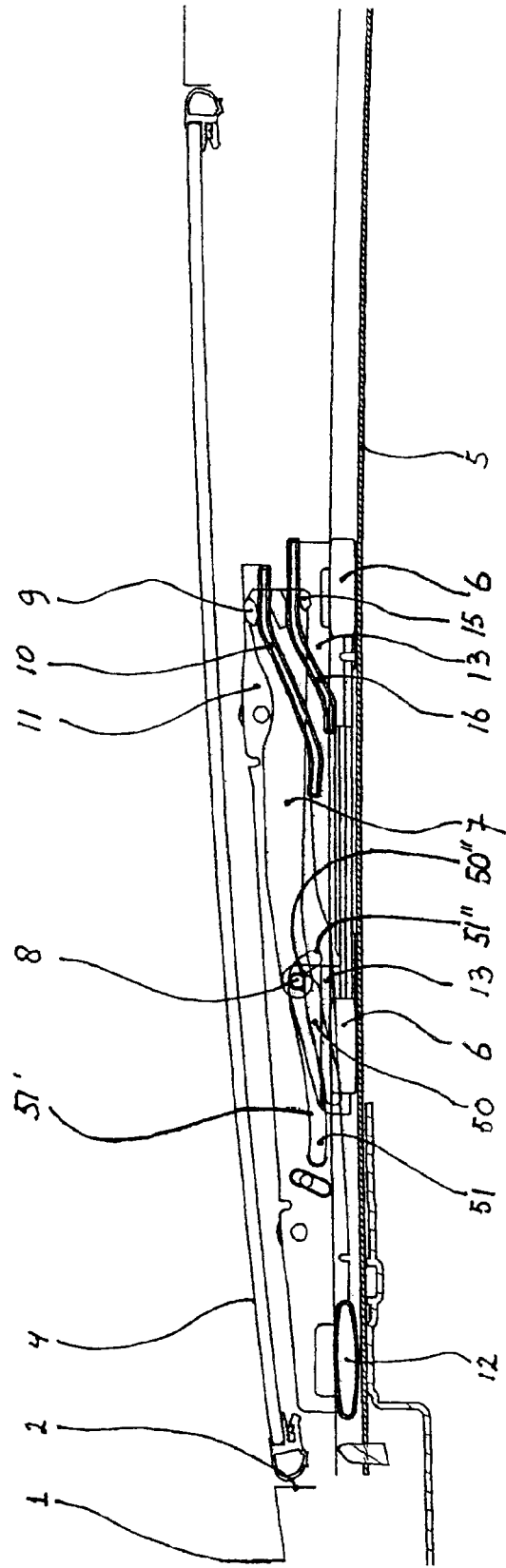
FIGS. 3, 4 and 5 are simplified longitudinal sectional views along to the line III-III in FIG. 1, showing the closure member in the closed position, the venting position and in a rearwardly slid open position, respectively.

FIGS. 2, 3, 4, 5 show an exemplary embodiment of the operating mechanism. Mounted on slide 6 is a height adjustable part 7, in the form of a long arm in this embodiment, which is connected to slide 6 by means of a horizontal, transversally extending pivot 8. Height adjustable part 7 extends in rearward direction from pivot 8 towards first and second guide members 9, 15. Said first and second guide members 9, 15 are in the shape of guide cams, which are in engagement with corresponding first and second guide tracks 10, 16 in the form of ribs extending substantially horizontal in transverse direction, and which form non-horizontal tracks in longitudinal direction of the guide rails 5. The curvature of the first and second guide tracks 10, 16 in longitudinal direction is quite similar and they extend substantially parallel when the panel 4 is in the closed position (FIG. 3). The main or intermediate portion of the first and second guide tracks 10, 16 extends vertically inclined at an angle to the guide rail 5. This main portion of the guide tracks 10, 16 is connected at its front and rear end with a respective front end portion and rear end portion, which extend substantially parallel to the guide rail 5, especially when the respective guide member 9, 15 is in engagement with respective end portion. Said first guide member 9 is in engagement with first guide track 10. Said guide track 10 extends from a curve plate 11, which is mounted at the underside of panel 4.

On its front side, curve plate 11 is equipped with a horizontal, transversally extending slide shoe 12, by means of which panel 4 can pivot about its front side. Slide shoe 12 is slidably supported in guide rail 5. The second guide member 15 is in engagement with the second guide track 16. Said guide track 16 extends from a curve part 13, which is a slidable part, sliding in guide rail 5 together with slide 6 which is in this embodiment fixed to curve part 13. The first and second guide members 9, 15 are provided on the same side of height-adjustable part 7 and engage first and second guide tracks 10, 16 from the same side.

Figure 7:
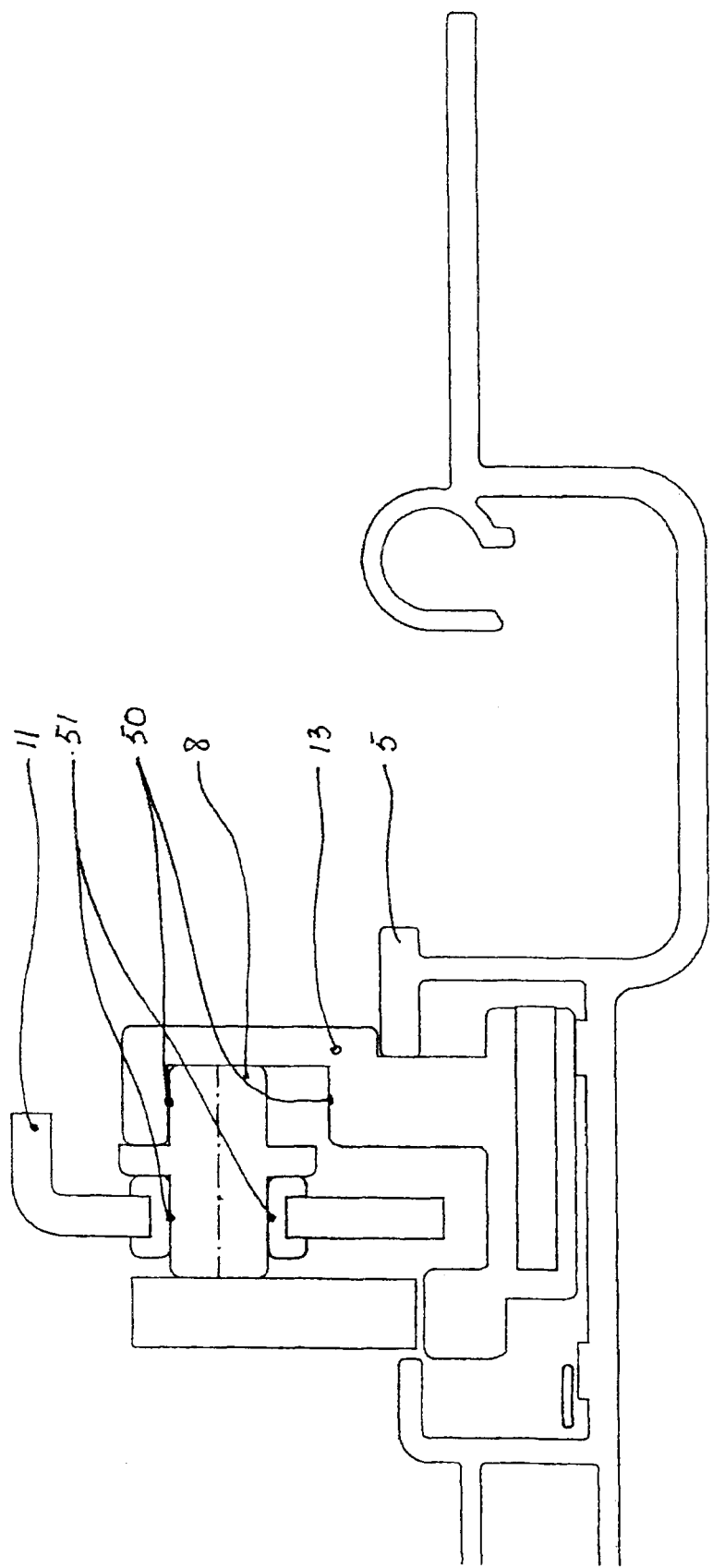
FIG. 7 is a sectional view along the line VII-VII in FIG. 6.

Pivot 8 on height-adjustable part 7 is in engagement with first and second guide curves 50, 51. Said first guide curve 50 is provided in a front portion of slide 6 proximate shoe 12 and on a side facing curve plate 11. In FIG. 2, slot 50 is indicated in dashed lines. The first guide curve 50 includes a long front portion 50' and a short rear locking portion 50" extending almost vertically in upward direction. The second guide curve 51 provided on curve plate 11 includes a long front portion 51' and a short rear unlocking portion 51" extending rearwardly and downwardly from the front portion 51'. In one embodiment, the composite width of the curves 50, 51 and intermediate pivot 8 and height-adjustable part 7 is smaller than that of the guide channel 5 in which shoe 12 and slide 6 are guided in (see FIG. 7) such that no increase in width of the operating mechanism is caused thereby.

The operation of the open roof construction as shown and described is as follows.

Figure 8:
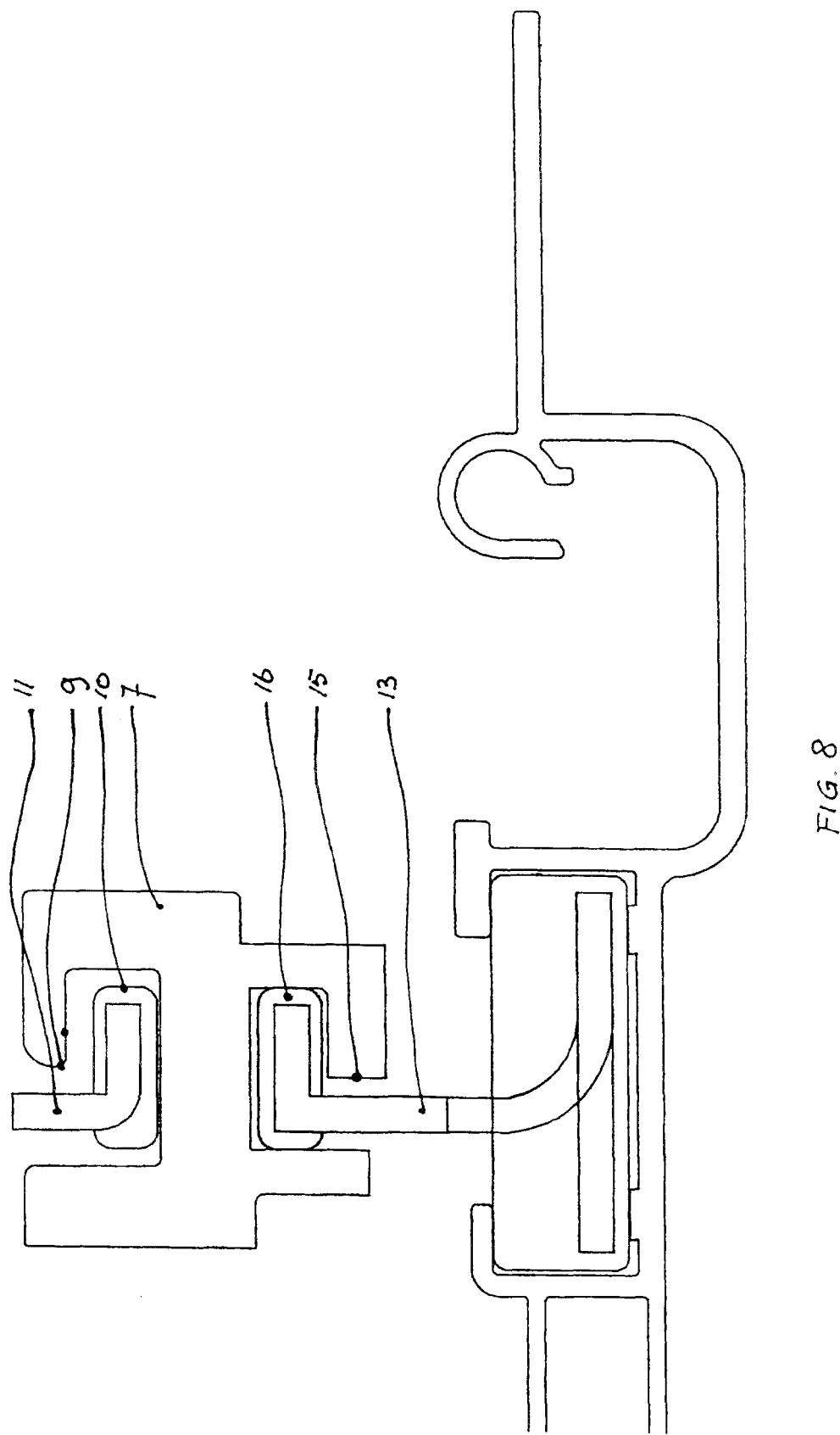
FIG. 8 is a sectional view along the line VIII-VII in FIG. 6.

FIG. 3 shows the operating mechanism in a position in which the panel 4 is in its closed position in the roof opening 2. The guide members 9, 15 of the height-adjustable part 7 are in engagement with the first and second guide tracks 10, 16 at a position near the rear ends thereof. The first and second guide curves 10, 16 overlap each other almost completely in longitudinal and in vertical direction, but due to their parallel nestable shape they do not cross, so that they can also overlap in transverse direction, and FIG. 8 shows that the first and second guide tracks 10, 16 overlap completely in transverse direction, so that they occupy minimum space in transverse direction, while the nestability of the tracks 10, 16 also limits the package height of the operating mechanism.

The pivot pin 8 of the height-adjustable part 7 is in engagement with the rear locking portion 50″ of the first guide curve 50 and with the second guide curve 51 at a position between the front and rear portions 51′ and 51″.

Figure 4:
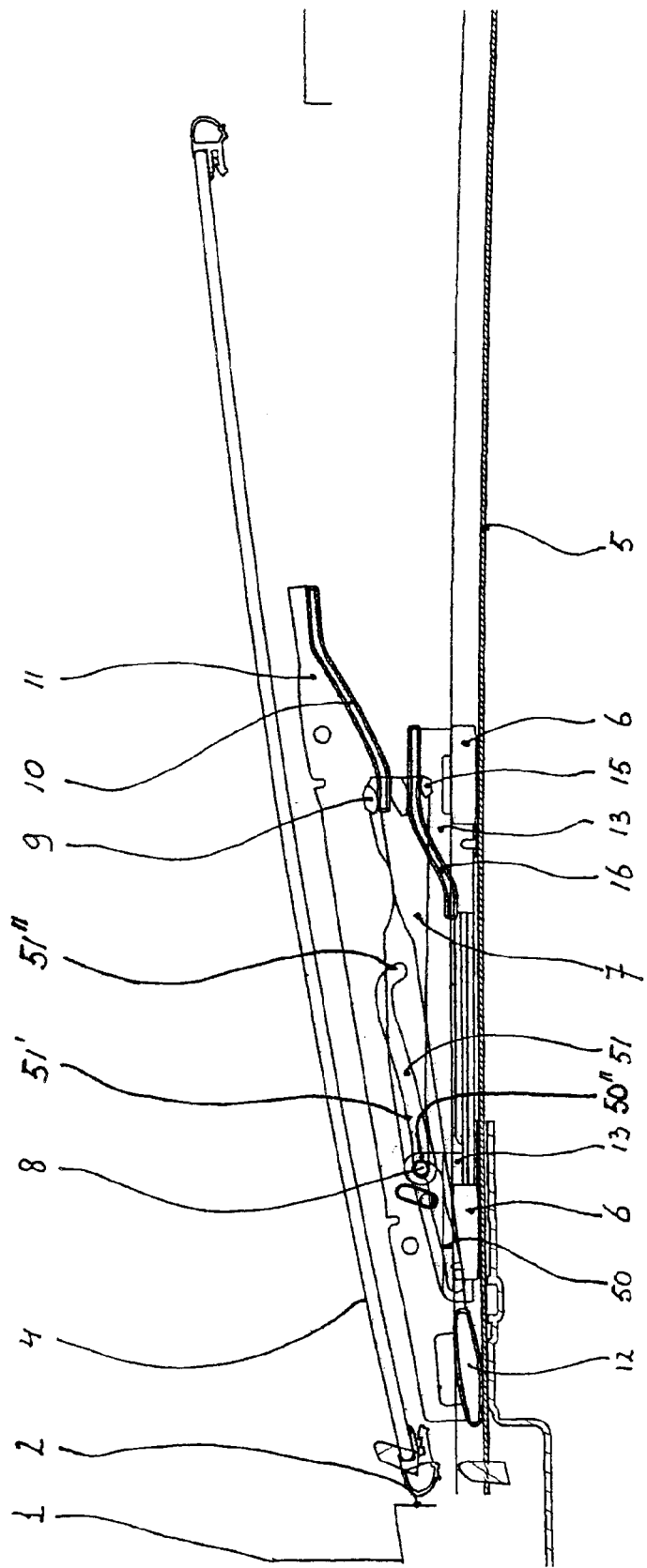

FIG. 4 shows the operating mechanism in the venting position of the panel 4. To obtain this position, the slide 6 is moved a distance forwardly. As the curve part 13 is fixed to the slide 6, it moves along with slide 6. Also the pivot 8 of the height adjustable part 7 is fixed within the locking portion 50″ of the first guide track 50 in the curve part 13, and this means that the height adjustable part 7 moves along with curve part 13 and, consequently, second guide member 15 is substantially stationary with respect to second guide track 16 which has also moved with the curve part 13.

During the displacement of slide 6, panel 4 has been kept substantially stationary in longitudinal direction by a locking mechanism not shown (but known in the art, see for example WO 00/06403 the contents of which are incorporated herein by reference in its entirety), so that slide 6 and curve part 13 will slide with respect to curve plate 11. As a consequence, first guide track 10 is moved relative to the, substantially stationary, first guide member 15 of height-adjustable part 7 and therefore panel 4 is pivoted in dependence of the curvature of the first guide track 10. In FIG. 4 first guide member 9 is positioned near the front end of first guide track 10. Second guide curve 51 (having a shape similar to that of first guide track 10) allows curve plate 11 to move with respect to pivot pin 8. The panel 4 pivots on slide shoe 12, and there may be provided a well known compensation mechanism that results in slight longitudinal movements of the panel compensating the longitudinal movements of the front side of panel 4 as a result of the pivoting movement thereof.

In the position of FIG. 4, the first and second guide tracks do not overlap in vertical direction and are in such relative position that the necessary tilting height is obtained.

Figure 5:
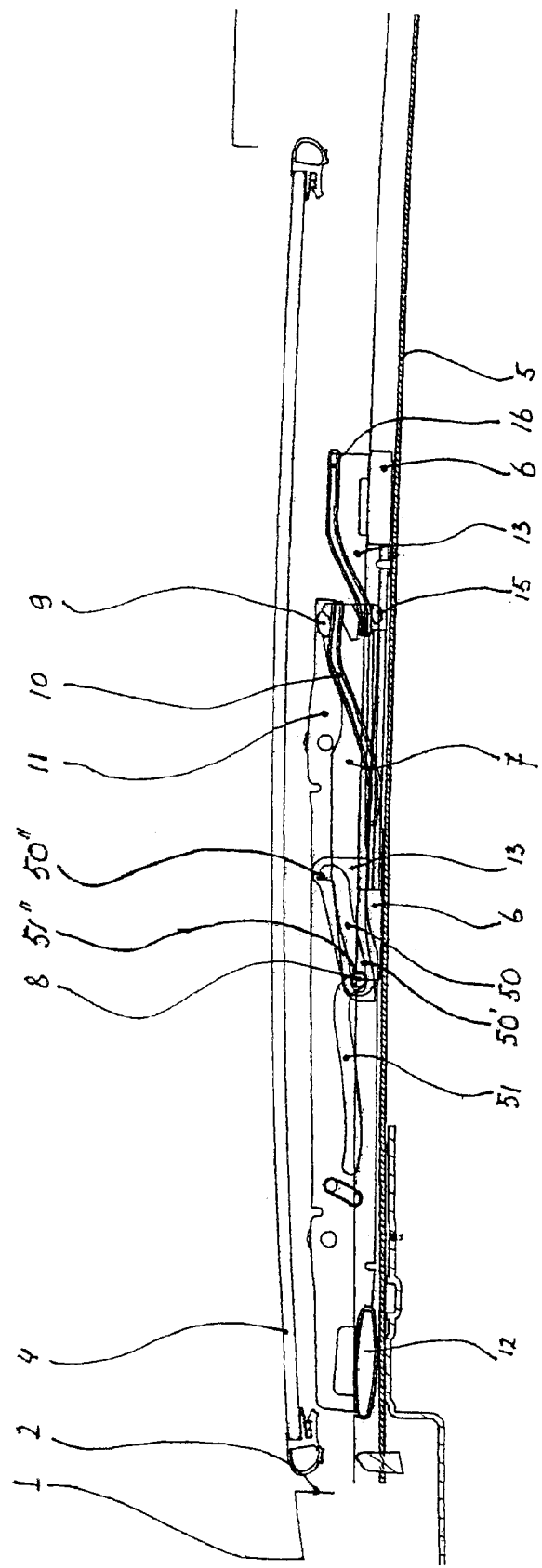
Figure 6:
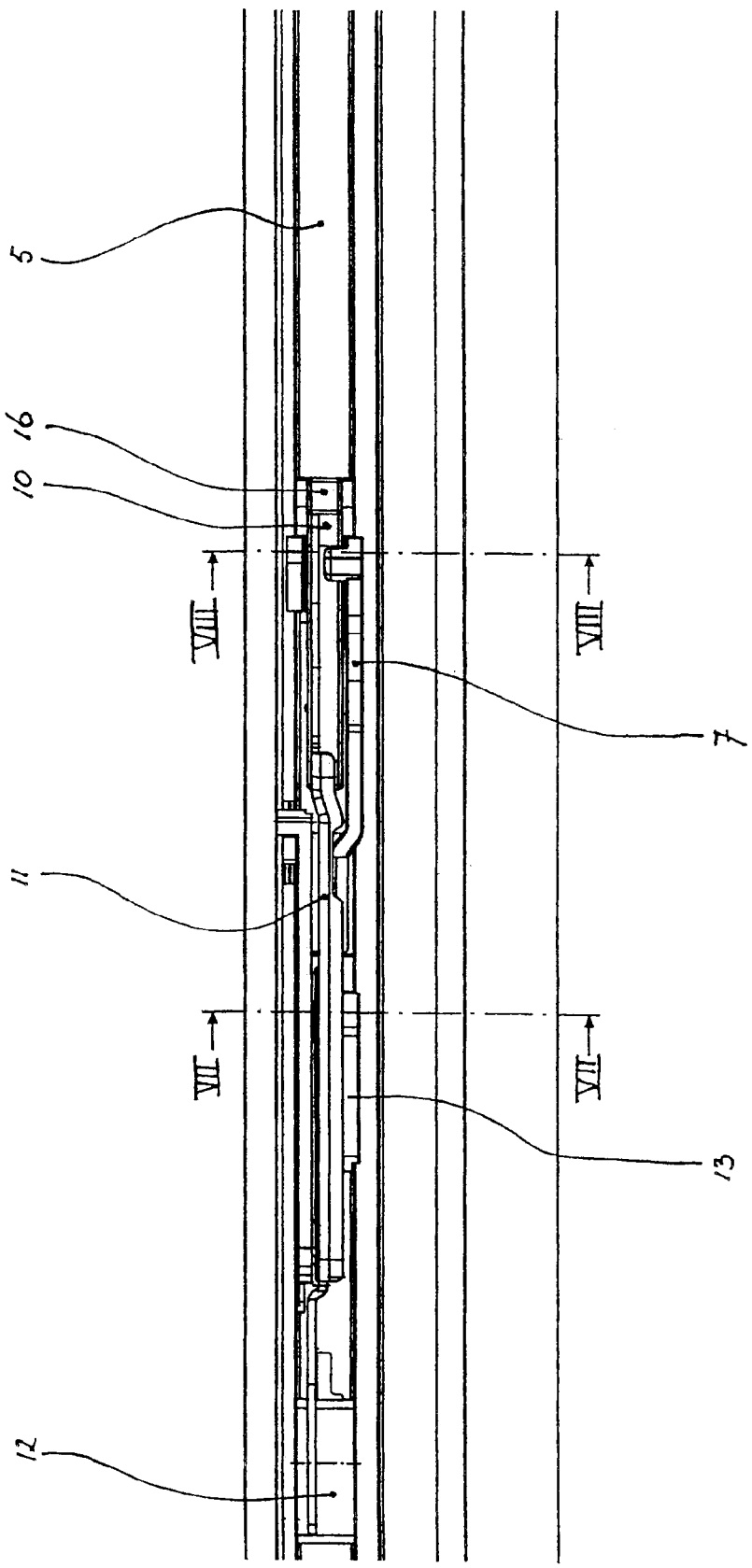
FIG. 6 is a plan view of the operating mechanism and guide rail of FIG. 2, in a position in which the closure member is in its closed position.

FIG. 5 shows the operating mechanism in a position in which the panel 4 is moved downwardly so as to be able to slide underneath the fixed roof 1 behind roof opening 2. To obtain this position, slide 6 is moved from the closed position rearwardly. Pivot pin 8 is carried along through locking portion 50′ of first guide curve 50, so that first guide member 9 is moved with respect to first guide track 10. Since the relevant portion of first guide track 10 extends horizontal, the panel 4 will remain in the same vertical position and as a result, the unlocking portion 51″ of second guide curve 51 will urge pivot pin 8 downwardly such that it will leave locking portion 50″ of first guide curve 50. This enables pivot pin 8 to move through front portion 50′ of first guide curve 50 and consequently curve plate 13 moves while pivot pin 8 and therewith height-adjustable part 7 remain substantially stationary in longitudinal direction. This means that second guide track 16 moves with respect to second guide member 15, while first guide member 9 remains stationary at the rear end of first guide track 10. Second guide member 15 is moved downwardly following the curve of second guide track 16 and the pivoting movement of the height-adjustable member 7 is followed by first guide member 9, first guide track 10, curve plate 11 and consequently panel 4 which is thus moved, in particularly pivoted downwardly. Due to the longitudinal relative movement of guide curves 10, 16 in such direction that the vertical spacing between them becomes larger, it is possible to further lower first guide track 10 with respect to second guide track 16 without these curves crossing each other, so that the relative longitudinal movement of the guide tracks enables a lowering of panel 4 even with the guide tracks lying in the same transverse position.

A further rearward movement of slide 6 from the position of FIG. 4 (in which pin 8 has reached the rear end of guide curve 50) results in a sliding movement of the complete operating mechanism and panel 4 as a unit. In a rearward position pivot pin 8 will be locked with respect to both guide curves 50, 51 for example by preventing an upward movement through an overhead flange or the like. In that case the operating mechanism and panel will also act as a fixed unit during a forward movement of the panel until the position of FIG. 5 has been reached again. The movements for closing panel 4 again are in reverse order.

The invention is not restricted to the above described embodiment as shown in the drawing, which can be varied in several ways without departing from the scope of the invention.

Thus, the invention can also be used with other types of open roof constructions, such as lifting roofs, spoiler roofs and other kinds of roofs comprising panels or other types of single or multiple closure member. The height adjustable part of the slide could also be in engagement with the guide tracks of the closure member and the stationary part formed as slots via one guide pin or other type of guide member. The guide members and the guide tracks could also be kinetically reversed, while the first and second guide members could be integrated in one part.

It is beneficial in relation to dynamic and functional-static noises, that, during movements of the closure member from the closed position to the slid-open or venting positions, the operating mechanism parts that are used to create the horizontal and vertical movements of the closure member are with their respective contact points in constant engagement with each other.

Preferably the material of the height-adjustable part is steel, but also reinforced plastic materials or the like may be used.

In a embodiment in which the height adjustable part is made of plastic material, a considerable weight saving is possible compared to the mechanism as shown in WO 00/06403.

Although it is advantageous to have the first and second guide tracks extend on only one side of the curve plate or curve part, respectively, it is conceivable that the guide tracks extend on both sides thereof cooperating with a double set of guide members. The double guide tracks could be of the same width as the single guide tracks in the embodiment as shown herein.

What is claimed is:

1. An open roof construction for a vehicle having an opening in the fixed roof, comprising:
    stationary longitudinal guide rails, where a guide rail is disposed on each side of the roof opening;
    a closure member;
    a pair of slides, each slide slidable on one of the longitudinal guide rails, where each of the slides includes an operating mechanism supporting the closure member so as to be adjustable between a first position and a second position where the closure member in a different position relative to the guide rails than the first position, wherein each operating mechanism comprises a curve plate attached to the closure member and having a first guide track with which a first guide member connected to the slide is in engagement, at least along part of the path of movement of the closure member, wherein each slide includes a height-adjustable part which is equipped with the first guide member, and is also equipped with a second guide member which is in engagement with a second guide track which is at least partially inclined vertically, said second guide track being provided on a curve part which is connected to the corresponding longitudinal guide rail, wherein another portion of the height-adjustable part is coupled to at least one of the curve plate and the curve part, said another portion changing position in height relative to the respective guide rail for movement of the closure member between the first and second positions, wherein the first and second guide tracks of each operating mechanism are positioned relatively such that they have a common vertical longitudinal plane extending therethrough, and the first and second guide tracks being selectively movable with respect to each other in a direction parallel to the longitudinal guide rails while maintaining at least a partial overlap between the first and second guide tracks when viewed from a side of the closure member opposite to the curve plate and maintaining the first and second guide tracks spaced apart from each other when viewed from a side transverse to the vertical longitudinal plane.

2. The open roof construction of claim 1, wherein the first and second guide tracks have similar shapes.

3. An open roof construction for a vehicle having an opening in the fixed roof, comprising:
    stationary longitudinal guide rails, where a guide rail is disposed on each side of the roof opening;
    a closure member;
    a pair of slides, each slide slidable on one of the longitudinal guide rails, where each of the slides includes an operating mechanism supporting the closure member so as to be adjustable between a closed position, in which the closure member closes the roof opening, and an open position, in which the closure member releases the roof opening at least partially, wherein each operating mechanism comprises a curve plate attached to the closure member and having a first guide track with which a first guide member connected to the slide is in engagement, at least along part of the path of movement of the closure member, wherein each slide includes a height-adjustable part which is equipped with the first guide member, and is also equipped with a second guide member which is in engagement with a second guide track which is at least partially inclined vertically, said second guide track being provided on a curve part which is connected to the corresponding longitudinal guide rail, wherein the first and second guide tracks of each operating mechanism are positioned relatively such that they have a common vertical longitudinal plane extending therethrough, and the first and second guide tracks being selectively movable with respect to each other in a direction parallel to the longitudinal guide rails while maintaining at least a partial overlap between the first and second guide tracks when viewed from a side of the closure member opposite to the curve plate and maintaining the first and second guide tracks spaced apart from each other when viewed from a side transverse to the vertical longitudinal plane, wherein the first and second guide tracks have front and rear end portions forming the lowest and highest portions of the first and second guide tracks and extending substantially parallel to the respective longitudinal guide rail at least in the position of the closure member in which the first and second guide member are in engagement with said front and rear end portions, and have a vertically inclined intermediate portion between said end portions.

4. The open roof construction of claim 2, wherein the first and second guide members are continuously in engagement with their respective first and second guide tracks, and wherein in a tilted position of the closure member relative to the longitudinal guide rails the first guide member is in engagement with a lowest portion of the first guide track and the second guide member is in engagement with a highest portion of the second guide track.

5. The open roof construction of claim 1, wherein the first and second guide tracks have front and rear end portions forming the lowest and highest portions of the first and second guide tracks and extending substantially parallel to the respective longitudinal guide rail at least in a position of the closure member in which the first and second guide member are in engagement with said front and rear end portions respectively, and have a vertically inclined intermediate portion between said end portions.

6. An open roof construction for a vehicle having an opening in the fixed roof, comprising:
    stationary longitudinal guide rails, where a guide rail is disposed on each side of the roof opening;
    a closure member;
    a pair of slides, each slide slidable on one of the longitudinal guide rails, where each of the slides includes an operating mechanism supporting the closure member so as to be adjustable between a closed position, in which the closure member closes the roof opening, and an open position, in which the closure member releases the roof opening at least partially, wherein each operating mechanism comprises a curve plate attached to the closure member and having a first guide track with which a first guide member connected to the slide is in engagement, at least along part of the path of movement of the closure member, wherein each slide includes a height-adjustable part which is equipped with the first guide member, and is also equipped with a second guide member which is in engagement with a second guide track which is at least partially inclined vertically, said second guide track being provided on a curve part which is connected to the corresponding longitudinal guide rail, wherein the first and second guide tracks of each operating mechanism are positioned relatively such that they have a common vertical longitudinal plane extending therethrough, and the first and second guide tracks being selectively movable with respect to each other in a direction parallel to the longitudinal guide rails while maintaining at least a partial overlap between the first and second guide tracks when viewed from a side of the closure member opposite to the curve plate and maintaining the first and second guide tracks spaced apart from each other when viewed from a side transverse to the vertical longitudinal plane, and wherein portions of the first and second guide tracks extend substantially parallel to each other at least in the closed position of the closure member.

7. The open roof construction of claim 1, wherein the height-adjustable part is selectively movable with respect to the first and/or second guide track, and wherein each respective slide is fixed to the corresponding curve part.

8. The open roof construction of claim 1, and further comprising a locking mechanism for each side of the closure member wherein each height-adjustable part cooperates with the corresponding locking mechanism so as to substantially lock the height-adjustable part to one of the first and second guide tracks when the height-adjustable part moves with respect to the other of the first and second guide tracks.

9. The open roof construction of claim 8, wherein each locking mechanism comprises a first guide assembly connecting the height-adjustable part to the first guide track and a second guide assembly connecting the height-adjustable part to the second guide track, wherein each guide assembly comprises a guide element movable in a guide curve.

10. The open roof construction of claim 9, wherein the height-adjustable part includes a first guide element which is in engagement with a first guide curve of the curve plate and a second guide element in engagement with a second guide curve of the curve part.

11. The open roof construction of claim 10, wherein the first and second guide curves each include a locking and/or unlocking portion.

12. The open roof construction of claim 9, wherein each of the guide elements is a pivot pin that extends outwardly from the height-adjustable part, the pivot pins being aligned with each other, and wherein the height-adjustable part is an arm which is rotatable around the aligned pivot pins.

13. The open roof construction of claim 1, wherein the operating mechanism is adapted to cause the closure panel to make two distinct movements, and the height-adjustable part moves with respect to the first guide track during a first movement and the height-adjustable part moves with respect to the second guide track during a second movement.

14. The open roof construction of claim 13, constructed as a sliding-tilting roof, wherein the first movement is an upward tilting movement of the closure member relative to the guide rails from the first position and the second movement is a downward tilting movement of the closure member relative to the guide rails from the first position.

15. The open roof construction of claim 8, wherein the locking mechanism is constructed such that the locking mechanism is adjusted between locking the height-adjustable part to the first guide track and locking the height-adjustable part to the second guide track when the height-adjustable part moves with respect to both the first and second guide track.

16. The open roof construction of claim 1, wherein the first and second guide tracks are positioned one above the other.

17. The open roof construction of claim 16, wherein the first and second guide members engage a respective one of the first and second guide tracks from one side.

18. The open roof construction according to claim 1, wherein the height-adjustable part is an arm which is rotatable around a pivot pin, and the length of the arm is greater than that of the first and second guide tracks.

19. The open roof construction of claim 6, wherein the first and second guide tracks have lengths that differ no more than 50% of the shortest length of the first and second guide tracks.

20. An open roof construction for a vehicle having an opening in the fixed roof, comprising:
stationary longitudinal guide rails, where a guide rail is disposed on each side of the roof opening;
a closure member;
a pair of slides, each slide slidable on one of the longitudinal guide rails, where each of the slides includes an operating mechanism supporting the closure member so as to be adjustable between a closed position, in which the closure member closes the roof opening, and an open position, in which the closure member releases the roof opening at least partially, wherein each operating mechanism comprises a curve plate attached to the closure member and having a first guide track with which a first guide member connected to the slide is in engagement, at least along part of the path of movement of the closure member, wherein each slide includes a height-adjustable part which is equipped with the first guide member, and is also equipped with a second guide member which is in engagement with a second guide track which is at least partially inclined vertically, said second guide track being provided on a curve part which is connected to the corresponding longitudinal guide rail, wherein the first and second guide tracks of each operating mechanism are positioned relatively such that they have a common vertical longitudinal plane extending therethrough, and the first and second guide tracks being selectively movable with respect to each other in a direction parallel to the longitudinal guide rails while maintaining at least a partial overlap between the first and second guide tracks when viewed from a side of the closure member opposite to the curve plate and maintaining the first and second guide tracks spaced apart from each other when viewed from a side transverse to the vertical longitudinal plane, and wherein the first and second guide tracks have similar shapes and are continuously in engagement with their respective first and second guide members, and wherein in a tilted position of the closure member relative to the longitudinal guide rails the first guide member is in engagement with a lowest portion of the first guide track and the second guide member is in engagement with a highest portion of the second guide track.

21. The open roof construction of claim 3, wherein portions of the first and second guide tracks extend substantially parallel to each other at least in the first position of the closure member.

22. An open roof construction for a vehicle having an opening in the fixed roof, comprising:
stationary longitudinal guide rails, where a guide rail is disposed on each side of the roof opening;
a closure member;
a pair of slides, each slide slidable on one of the longitudinal guide rails, where each of the slides includes an operating mechanism supporting the closure member so as to be adjustable between a closed position, in which the closure member closes the roof opening, and an open position, in which the closure member releases the roof opening at least partially, wherein each operating mechanism comprises a curve plate attached to the closure member and having a first guide track with which a first guide member connected to the slide is in engagement, at least along part of the path of movement of the closure member, wherein each slide includes a height-adjustable part which is equipped with the first guide member, and is also equipped with a second guide member which is in engagement with a second guide track which is at least partially inclined vertically, said second guide track being provided on a curve part which is connected to the corresponding longitudinal guide rail, wherein the first and second guide tracks of each operating mechanism are positioned relatively such that they have a common vertical longitudinal plane extending therethrough, and the first and second guide tracks being selectively movable with respect to each other in a direction parallel to the longitudinal guide rails while maintaining at least a partial overlap between the first and second guide tracks when viewed from a side of the closure member opposite to the curve plate and maintaining the first and second guide tracks spaced apart from each other when viewed from a side transverse to the vertical longitudinal plane, wherein the first and second guide members engage a respective one of the first and second guide tracks from one side.

* * * * *